US012686169B2

(12) United States Patent
Nakamura et al.

(10) Patent No.: US 12,686,169 B2
(45) Date of Patent: Jul. 21, 2026

(54) PLASTICIZING DEVICE AND THREE-DIMENSIONAL MODELING APPARATUS

(71) Applicant: SEIKO EPSON CORPORATION, Tokyo (JP)

(72) Inventors: Kazuhide Nakamura, Asahi-mura (JP); Taki Hashimoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 178 days.

(21) Appl. No.: 18/635,242

(22) Filed: Apr. 15, 2024

(65) Prior Publication Data

US 2024/0351280 A1     Oct. 24, 2024

(30) Foreign Application Priority Data

Apr. 18, 2023     (JP) ................................. 2023-067626

(51) Int. Cl.
B29C 64/209        (2017.01)
B29C 64/295        (2017.01)
B33Y 30/00          (2015.01)

(52) U.S. Cl.
CPC .......... B29C 64/209 (2017.08); B29C 64/295 (2017.08); B33Y 30/00 (2014.12)

(58) Field of Classification Search
CPC ... B29C 64/118; B29C 64/188; B29C 64/393; B29C 64/205; B29C 64/209; B29C 64/241; B29C 64/227; B29C 64/295; B29C 64/329; B29C 64/343; B29C 64/336; B29C 45/46; B29C 45/1606; B29C 45/1629; B29C 45/1631; B29C 45/1632; B29C 48/47; B33Y 10/00; B33Y 30/00; B23P 19/001; B23P 19/004; B23P 21/006

See application file for complete search history.

(56) References Cited

U.S. PATENT DOCUMENTS

2020/0094480 A1*  3/2020  Yamasaki  ............... B22F 12/53
2021/0237348 A1*  8/2021  Anegawa  ............... B22F 10/18

FOREIGN PATENT DOCUMENTS

JP          2010-241016 A      10/2010

* cited by examiner

Primary Examiner — JaMel M Nelson
(74) Attorney, Agent, or Firm — WORKMAN NYDEGGER

(57)          ABSTRACT

A plasticizing device includes a screw having a groove formation surface with a groove and rotating around a rotation axis, a barrel having an opposed surface opposed to the groove formation surface in a direction along the rotation axis, with a communication hole for the plasticization material, a heater heating the material supplied, and a case housing the screw, wherein a first through hole communicating with the groove from an opposite surface to the groove formation surface and surrounded by a wall surface is formed in the screw, the material is supplied to the groove through a supply path and the first through hole, and a space is provided between an entrance of the first through hole and a material feed port provided in a terminal end portion closer to the screw of a terminal end of the supply path in the direction along the rotation axis.

9 Claims, 12 Drawing Sheets

PLASTICIZING DEVICE AND THREE-DIMENSIONAL MODELING APPARATUS

The present application is based on, and claims priority from JP Application Serial Number 2023-067626, filed Apr. 18, 2023, the disclosure of which is hereby incorporated by reference herein in its entirety.

BACKGROUND

1. Technical Field

The present disclosure relates to a plasticizing device and a three-dimensional modeling apparatus.

2. Related Art

To downsize an injection molding machine, a plasticizing device having a rotor in place of a screw of related art is proposed. For example, JP-A-2010-241016 discloses a plasticization feeder including a rotor having an end surface as a groove formation surface in which a helical groove is formed and a barrel having a convex conical surface as an opposed surface opposed to the groove formation surface, in which a heater and a communication hole are provided. According to JP-A-2010-241016, a material is supplied to the plasticization feeder from a radial outer end portion of the rotor. The radial outer end portion is a portion in which the terminal end of the helical groove is open in the outer circumferential side surface of the rotor and also called a supply port.

However, in the plasticization feeder of JP-A-2010-241016, there is a problem that stable plasticization is difficult. Specifically, in the plasticization feeder of JP-A-2010-241016, the material is supplied to the supply port when the rotor rotates one revolution and the supply port in the outer circumferential side surface of the rotor and a feed port communicating with a hopper overlap. Accordingly, the mashed material may enter between the outer circumferential side surface of the rotor and a case housing the rotor and interfere with the rotation of the rotor.

Therefore, a plasticizing device having stable plasticization performance is desired.

SUMMARY

A plasticizing device according to an aspect of the present disclosure is a plasticizing device producing a plasticization material by plasticizing a material, including a screw having a groove formation surface with a groove formed therein and rotating around a rotation axis, a barrel having an opposed surface opposed to the groove formation surface in a direction along the rotation axis, in which a communication hole for the plasticization material to flow out is provided, a heater heating the material supplied to between the groove formation surface and the opposed surface, and a case housing the screw, wherein a supply path for supplying the material to the groove is provided, a first through hole communicating with the groove from an opposite surface to the groove formation surface and surrounded by a wall surface is formed in the screw, the material is supplied to the groove through the supply path and the first through hole, a space is provided between an entrance of the first through hole and a material feed port provided in a terminal end portion closer to the screw of a terminal end of the supply path in the direction along the rotation axis, and the entrance of the first through hole and the space communicate in a period of one revolution of the screw.

BRIEF DESCRIPTION OF THE DRAWINGS

FIG. 1 is a schematic configuration diagram of a three-dimensional modeling apparatus according to Embodiment 1.

FIG. 2 is a sectional view of a main part showing a schematic configuration of a plasticizing device.

DESCRIPTION OF EMBODIMENTS

Embodiment 1

Outline of Three-Dimensional Modeling Apparatus

Figure 1:
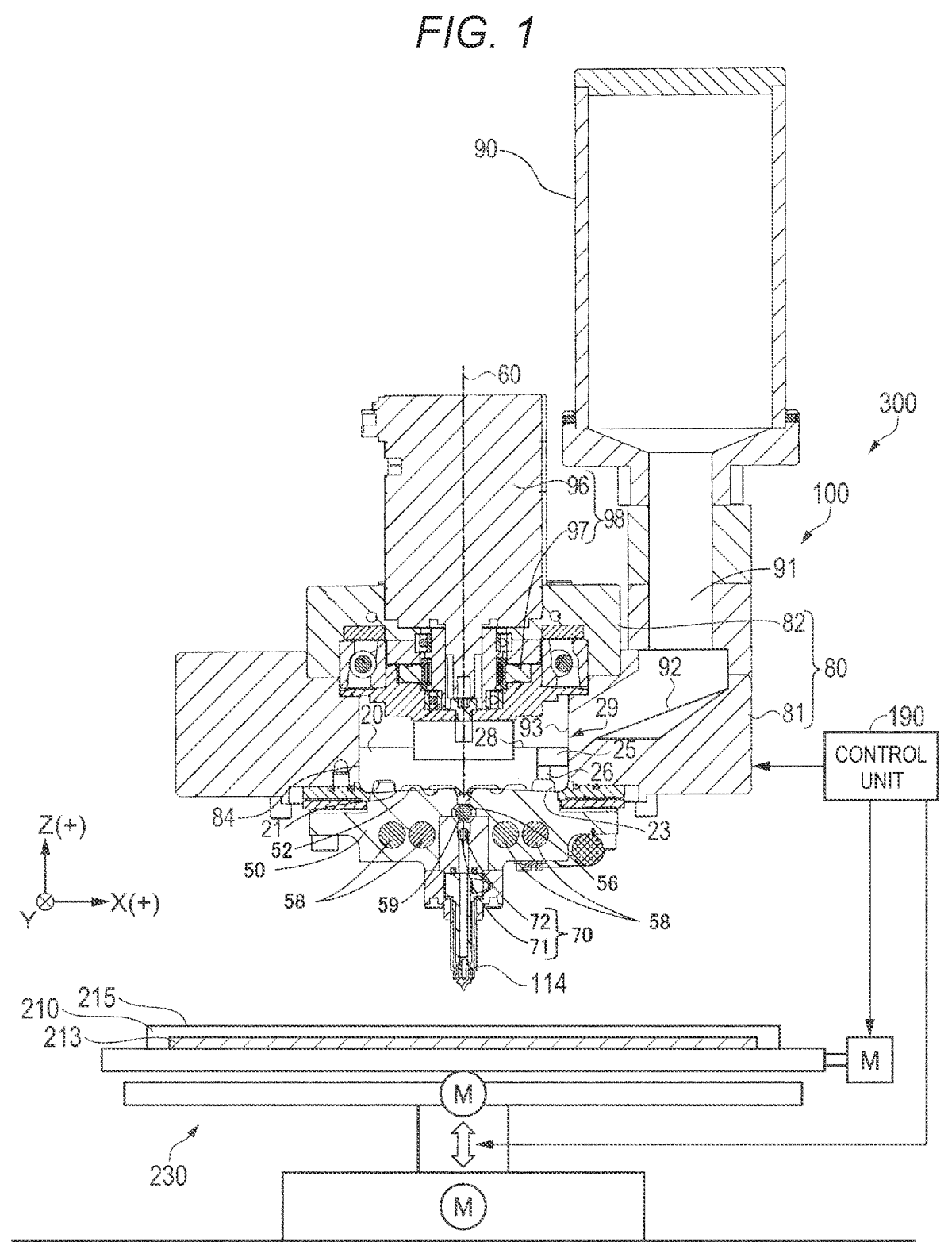
Figure 3:
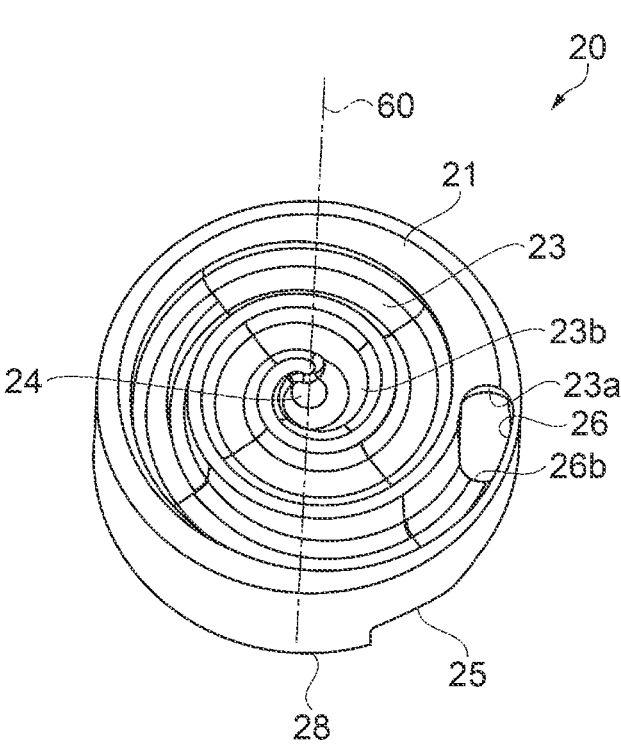
FIG. 3 is a perspective view of a flat screw as seen from a groove formation surface side.

FIG. 1 is a schematic configuration diagram of a three-dimensional modeling apparatus according to Embodiment 1.

As shown in FIG. 1, a three-dimensional modeling apparatus 300 of the embodiment includes a plasticizing device 100 producing and discharging a modeling material made of a plasticization material, a stage 210 having a modeling surface 215 on which the modeling material is laminated, a position change unit 230 changing a relative position of a nozzle portion 114 and the stage 210, a control unit 190, etc.

The stage 210 is placed in a position facing the nozzle portion 114. In the embodiment, the modeling surface 215 of the stage 210 facing the nozzle portion 114 is placed in parallel to X, Y directions, i.e., horizontal directions. The three-dimensional modeling apparatus 300 models a three-dimensional modeled object by discharging the modeling material from the tip end of the nozzle portion 114 toward the modeling surface 215 of the stage 210 and laminating layers.

On the stage 210, a stage heater 213 is provided as a heating unit. The stage heater 213 suppresses a sharp drop of the temperature of the modeling material discharged onto the stage 210.

The position change unit 230 changes the relative position of the nozzle portion 114 and the stage 210. In the embodiment, the position of the nozzle portion 114 is fixed and the position change unit 230 moves the stage 210. The position change unit 230 includes a three-axis positioner moving the stage 210 in three axis directions of X, Y, Z directions by drive forces of three motors.

The control unit 190 is a controller for integrated control of the operation of the three-dimensional modeling apparatus 300 including the plasticizing device 100 and the position change unit 230. The control unit 190 is configured as a computer including a CPU and a memory and controls the respective parts of the three-dimensional modeling apparatus 300 by the CPU executing programs stored in the memory. Note that the control unit 190 may be configured using a circuit. Further, electric power is supplied from a power supply unit to the respective parts of the three-dimensional modeling apparatus 300, however, the illustration thereof is omitted.

The position change unit 230 changes the relative position relationship between the nozzle portion 114 and the stage 210 under control of the control unit 190. Note that the movement of the nozzle portion 114 refers to relative movement of the plasticizing device 100 including the nozzle portion 114 to the stage 210.

In other words, the three-dimensional modeling apparatus 300 includes the plasticizing device 100, the nozzle portion 114 discharging the material plasticized by the plasticizing device 100, and the stage 210 having the modeling surface 215 on which the material is laminated.

Note that, in place of the configuration moving the stage 210 by the position change unit 230, a configuration moving the nozzle portion 114 relative to the stage 210 by the position change unit 230 with the position of the stage 210 fixed may be employed.

Or, a configuration moving the stage 210 in the Z directions by the position change unit 230 and moving the nozzle portion 114 in the X, Y directions or a configuration moving the stage 210 in the X, Y directions by the position change unit 230 and moving the nozzle portion 114 in the Z directions may be employed. According to these configurations, the relative position relationship between the nozzle portion 114 and the stage 210 can be changed.
Schematic Configuration of Plasticizing Device FIG. 2 is a sectional view of a main part showing a schematic configuration of the plasticizing device.

Figure 2:
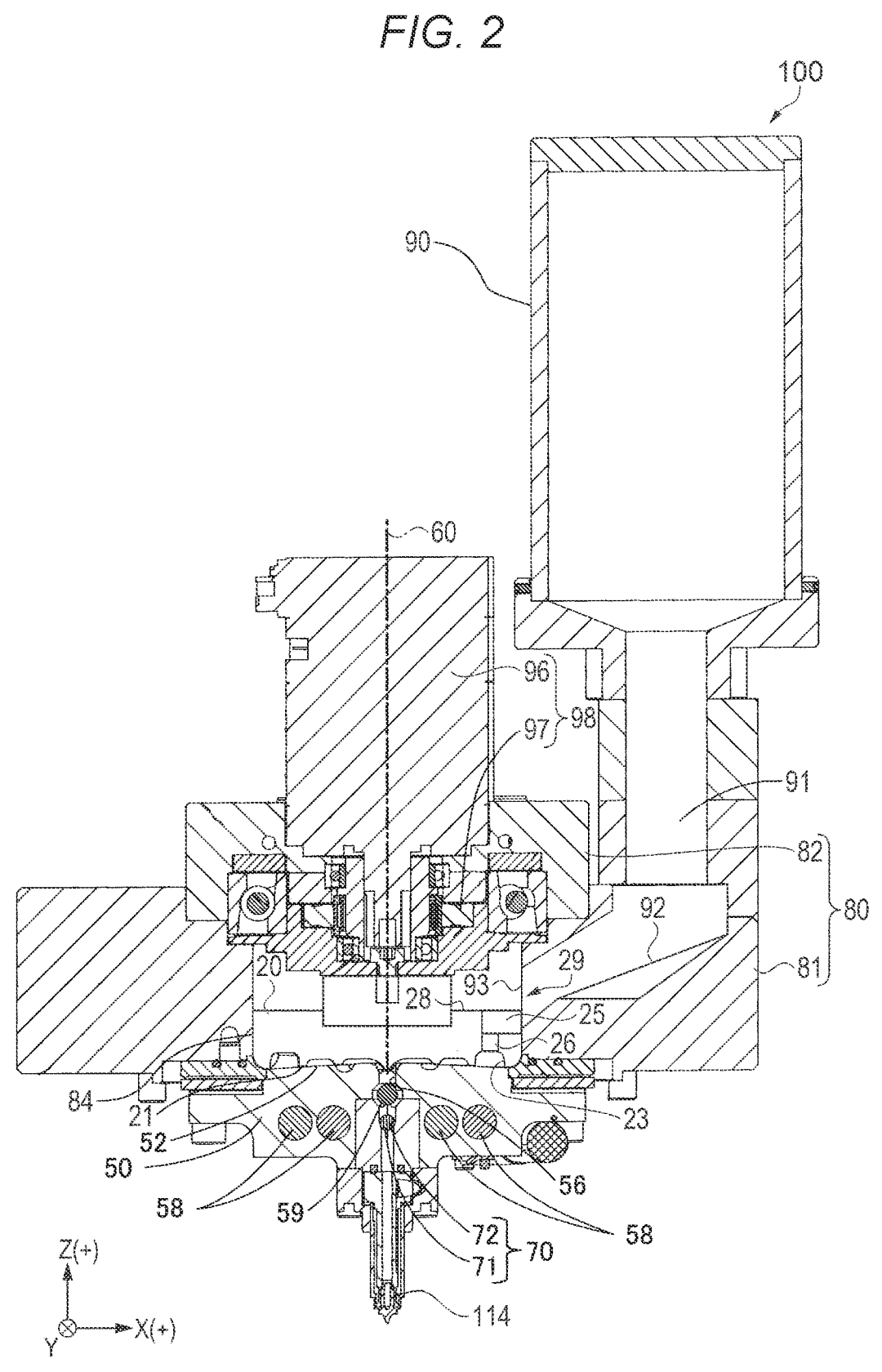

As shown in FIG. 2, the plasticizing device 100 includes a material reservoir unit 90, a flat screw 20, a barrel 50, heaters 58, a suction feed unit 70, etc. In FIG. 2, the nozzle portion 114 discharging the plasticized material is attached to the lower part of the barrel 50.

The plasticizing device 100 produces a modeling material by plasticizing a material supplied from the material reservoir unit 90 to between the flat screw 20 and the barrel 50 using the flat screw 20, the barrel 50, and the heaters 58 and injects the modeling material from the nozzle portion 114. Note that, in FIG. 2, the rotation axis of the flat screw 20 is a center line 60. Further, "plasticization" includes melting and changes a material from a solid state into a state having fluidity. Specifically, in a case of a material with glass transition, the plasticization refers to raising of the temperature of the material to a glass-transition point or more. In a case of a material without glass transition, the plasticization refers to raising of the temperature of the material to a melting point or more.

The material reservoir unit 90 is a hopper and contains a material for modeling. As the material for modeling, e.g., a thermoplastic resin formed in a pellet form is used. As the thermoplastic resin, e.g., ABS (acrylonitrile butadiene styrene), PC (polycarbonate), POM (polyacetal), PP (polypropylene), PBT (polybutylene terephthalate), or the like is used. Further, super engineering plastic represented by PEEK (Poly Ether Ether Ketone) may be used.

A pipe portion 91 is provided in the lower part of the material reservoir unit 90. The pipe portion 91 is coupled to a supply path 92 provided inside of a case 81. The lower end of the supply path 92 is a feed port 93 for the material.

The material in the material reservoir unit 90 passes from the pipe portion 91 through the supply path 92 and is supplied from the feed port 93 to a recessed portion 25 in a back surface 28 of the flat screw 20. The material supplied to the recessed portion 25 passes through a through hole 26 as a first through hole to a groove 23 of a groove formation surface 21 of the flat screw 20.

The flat screw 20 is also referred to as "rotor", "scroll", or simply "screw". The flat screw 20 is rotationally driven around the center line 60 along the Z-axis directions as a rotation axis by a rotor drive unit 98 including a drive motor 96 and a rotor reducer 97. The rotation of the flat screw 20 by the rotor drive unit 98 is controlled by the control unit 190 (FIG. 1). The flat screw 20 and the rotor reducer 97 are housed in a container unit 80. The container unit 80 has the case 81 and an upper cover 82.

The case 81 includes a housing hole 84 housing the flat screw 20 and pivotably houses the flat screw 20. The upper cover 82 is a member placed in the upper part of the case 81 to cover the flat screw 20 and the rotor reducer 97 from upside.

The drive motor 96 is placed in the upper part of the upper cover 82 with the output shaft thereof aligned with the center line 60.

A communication hole 56 into which the produced modeling material flows is formed at the center of the barrel 50. A cylinder 71 of the suction feed unit 70, which will be described later, is coupled to the communication hole 56. In the communication hole 56, a check valve 59 is provided upstream of the cylinder 71.

The heaters 58 are heating units and heat the material supplied to between the groove formation surface 21 of the flat screw 20 and an opposed surface 52 of the barrel 50. As shown in FIG. 2, in the embodiment, the four heaters 58 are provided within the barrel 50. The output of the heaters 58 is controlled by the control unit 190 (FIG. 1). Note that the heaters 58 may be provided in the lower part of the barrel 50, not within the barrel 50.

Figure 4:
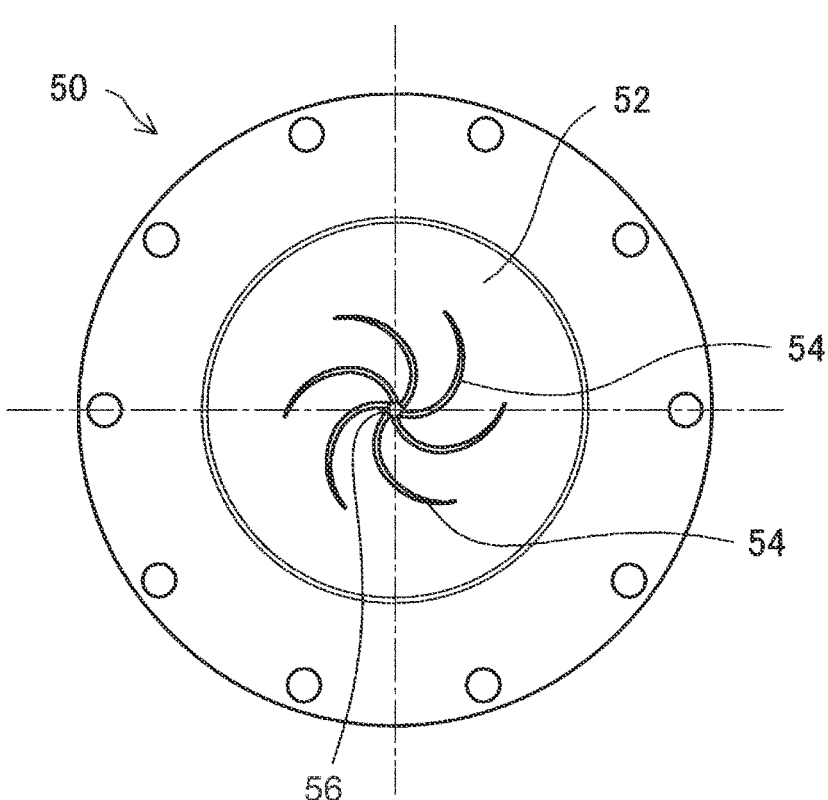
FIG. 4 is a plan view of a barrel.
Figure 4:
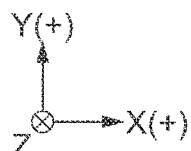

FIG. 3 is a perspective view of the flat screw as seen from the groove formation surface side. FIG. 4 is a plan view of the barrel.

As shown in FIG. 3, the flat screw 20 has substantially a circular columnar shape at a height in the direction along the center line 60 smaller than a diameter. In the groove formation surface 21 of the flat screw 20, the spiral groove 23 is formed around a center portion 24. The center portion 24 is a conical projection. The groove 23 is a spiral groove extending from a first end 23a closer to the peripheral edge portion of the flat screw 20 to a second end 23b closer to the center portion 24. The through hole 26 is provided at the first end 23a of the groove 23. In other words, the flat screw 20 has the groove formation surface 21 with the groove 23 formed therein and rotates around the center line 60 as the rotation axis.

The through hole 26 is a hole penetrating between the groove formation surface 21 and the back surface 28 as the opposite surface to the groove formation surface 21. In FIG. 3, an exit 26b at the groove 23 side in the through hole 26 is observed. In other words, in the flat screw 20, the through hole 26 communicating with the groove 23 from the back surface 28 at the opposite side to the groove formation surface 21 and surrounded by a wall surface is formed. Further, the groove 23 is the spiral groove extending from the first end 23a closer to the peripheral edge portion of the flat screw 20 to the second end 23b closer to the center of the flat screw 20 and the exit 26b of the through hole 26 is located at the first end 23a as seen from the direction along the center line 60.

As shown in FIG. 4, the barrel 50 has the opposed surface 52 opposed to the groove formation surface 21 of the flat screw 20.

The communication hole 56 is formed at the center of the opposed surface 52. In a preferred example, in the opposed surface 52, a plurality of guide grooves 54 coupled to the communication hole 56 and spirally extending from the communication hole 56 toward the outer circumference are formed. The guide groove 54 has a function of guiding the plasticization material to the communication hole 56. Note that the guide grooves 54 are not necessarily directly coupled to the communication hole 56 or the guide grooves 54 are not necessarily formed in the opposed surface 52. In other words, the barrel 50 has the opposed surface 52 opposed to the groove formation surface 21 in the direction along the center line 60 and has the communication hole 56 for the plasticization material to flow out.

Figure 5:
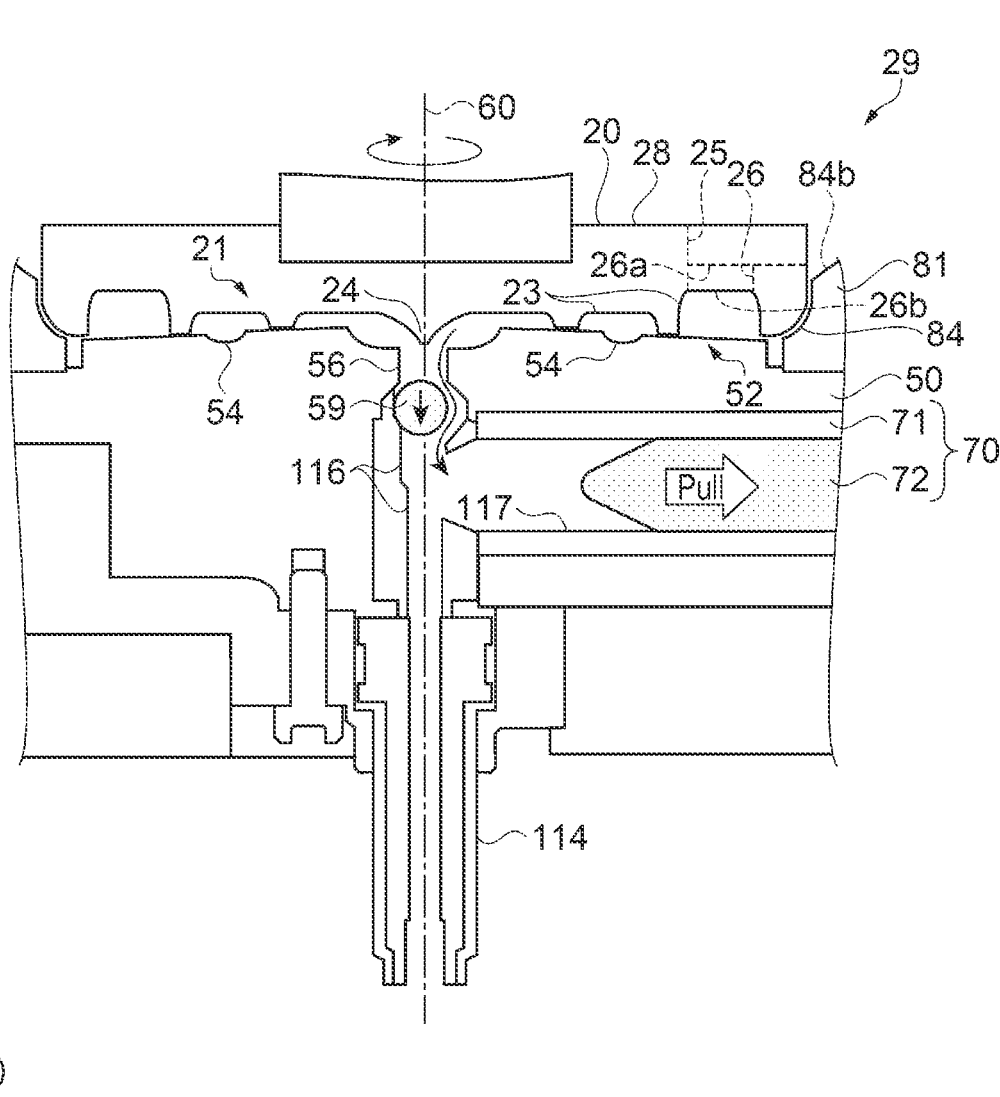
FIG. 5 is a sectional view showing one form when a material is suctioned.
Figure 5:
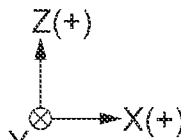
Figure 6:
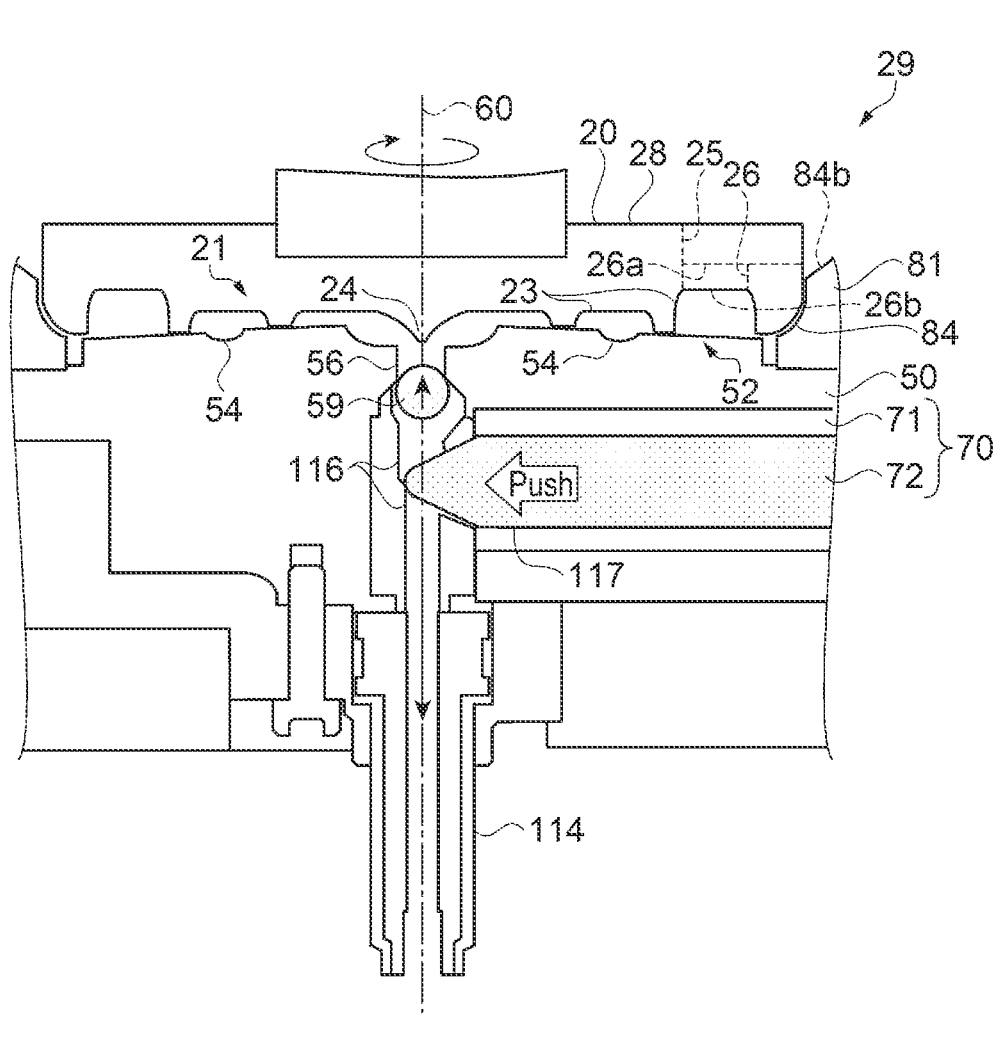
FIG. 6 is a sectional view showing one form when the material is press-fed.
Figure 6:
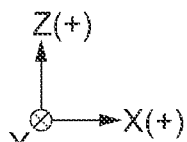

FIG. 5 is a sectional view showing one form when the material is suctioned. FIG. 6 is a sectional view showing one form when the material is press-fed.

As shown in FIG. 5, the suction feed unit 70 includes the cylinder 71, a plunger 72, a plunger driver (not shown), etc.

The cylinder 71 has a branched channel 117 branched from a channel 116 in the X minus direction. That is, the interior of the cylinder 71 serves as the branched channel 117. The cylinder 71 has substantially a cylinder shape and includes the plunger 72 inside.

The plunger 72 reciprocates in the X plus direction and the X minus direction inside of the cylinder 71. The suction feed unit 70 has a function of injecting the plasticization material within the cylinder 71 to the channel 116 at the nozzle portion 114 side.

When the material is suctioned, the plunger 72 moves in a direction away from the channel 116 inside of the cylinder 71 and suctions and measures the plasticization material into the branched channel 117. Concurrently, the check valve 59 moves in the Z minus direction and, as shown by an arrow, the plasticized material flows from the communication hole 56 into the branched channel 117 within the cylinder 71.

As shown in FIG. 6, when the material is press-fed, the plunger 72 moves in a direction closer to the channel 116 inside of the cylinder 71 and feeds out the plasticization material to the channel 116. Concurrently, the check valve 59 moves in the Z plus direction and closes the communication hole 56 to prevent backflow of the plasticization material toward the flat screw 20 side. Then, the plasticization material pushed out by the plunger 72 is press-fed to the nozzle portion 114 as shown by an arrow.

Note that, in the plasticizing device 100, the suction feed unit 70 is not an essential configuration, but may be omitted. When the suction feed unit 70 is omitted, plasticization conditions including the amount of supplied material, the rotation speed of the flat screw 20, and the heating temperatures of the heaters 58 are adjusted, and thereby, the amount of discharged plasticization material from the nozzle portion 114 is adjusted.

Structure of Supply Path of Material

Figure 7:
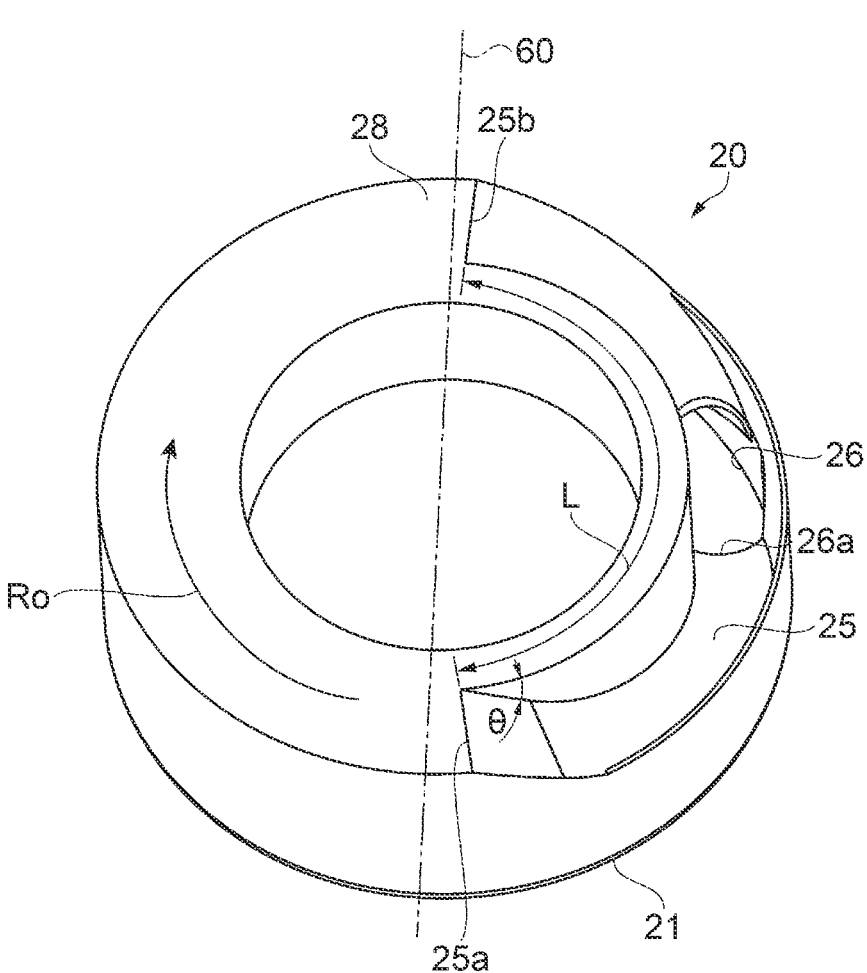
FIG. 7 is a perspective view of the flat screw as seen from a back surface side.
Figure 8:
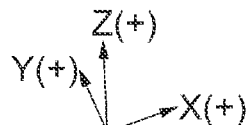
FIG. 8 is a perspective view showing a structure of a supply path of the material.

FIG. 7 is a perspective view of the flat screw as seen from the back surface side and corresponds to FIG. 3. FIG. 8 is a perspective view showing a structure of the supply path of the material.

FIG. 7 is the perspective view of the flat screw 20 as seen from the back surface 28 side. The flat screw 20 rotates in a rotation direction Ro around the center line 60.

In a planar configuration, the recessed portion 25 extends along the outer circumference of the flat screw 20 with a first side 25a as a start side and a second side 25b as an end side. The first side 25a is at the start point side in the rotation direction Ro and the second side 25b is at the end point side in the rotation direction Ro.

As shown in FIG. 7, a length L of the recessed portion 25 is shorter than a half of the length of the outer circumference of the flat screw 20. In other words, the recessed portion 25 extends along the outer circumference of the flat screw 20 and the length L of the recessed portion 25 is equal to or shorter than the half of the length of the outer circumference of the flat screw 20.

In the thickness direction of the flat screw 20, the recessed portion 25 is recessed with an inclination at an angle θ from the first side 25a with the back surface 28 as a reference surface and the through hole 26 is provided in the bottom-most part. The recessed portion 25 is inclined upward beyond the through hole 26 and reaches the same height as that of the back side 28 at the second side 25b. The through hole 26 is located at the second side 25b side in the recessed portion 25. In other words, the recessed portion 25 extends along the outer circumference of the flat screw 20 from the first side 25a to the second side 25b as boundaries of the recessed portion 25, the first side 25a is located anterior to the second side 25b in the rotation direction of the flat screw 20, and an entrance 26a of the through hole 26 in the recessed portion 25 is located closer to the second side 25b than the first side 25a. The entrance 26a of the through hole 26 in the recessed portion 25 is located at the opposite side in the rotation direction Ro of the flat screw 20.

In a preferred example, the angle θ of the inclined surface starting from the first side 25a is set to 35°. Note that, the angle is not limited to that as long as the material is easily guided to the through hole 26. The angle θ may be equal to or larger than 35°. In other words, the bottom surface of the recessed portion 25 has an inclined surface inclined so that the depth of the recessed portion 25 is deeper toward the through hole 26.

In the planar configuration, the through hole 26 is provided within the recessed portion 25. In other words, as seen from the direction along the center line 60, the area of the recessed portion 25 is larger than the area of the through hole 26.

FIG. 8 is the perspective view showing an extract of the flat screw 20 and the supply path structure of the material near the supply path 92. The flat screw 20 is rotatably housed in the housing hole 84 of the case 81. The supply path 92 is placed at the X plus side of the housing hole 84.

The supply path 92 is placed with an inclination relative to the upper surface of the case 81 and the terminal end thereof is the feed port 93. The upper end of the supply path 92 is coupled to the pipe portion 91. The pipe portion 91 communicates with the material reservoir unit 90 (FIG. 2).

FIG. 8 shows a state in which the through hole 26 of the recessed portion 25 of the flat screw 20 is located at the downside of the feed port 93. As shown in FIG. 8, in this state, a space 29 is formed between the entrance 26a of the through hole 26 and the feed port 93.

The space 29 is also shown in FIG. 5. As shown in FIG. 5, the space 29 is a temporarily retaining portion for the material formed in the front lower part of the feed port 93 and a space formed by the recessed portion 25 and a chamfered portion 84b around the housing hole 84. Further, as shown in FIGS. 5 and 8, the back surface 28 of the flat screw 20 projects from the housing hole 84.

In other words, the space 29 is provided between the entrance 26*a* of the through hole 26 and the feed port 93 provided in the terminal end portion closer to the flat screw 20 of the terminal end of the supply path 92 in the direction along the center line 60, and the entrance 26*a* of the through hole 26 and the space 29 communicate in a period of one revolution of the flat screw 20. Further, the recessed portion 25 as a part of the space 29 is formed in the back surface 28 as the opposite surface to the groove formation surface 21 of the flat screw 20, and the entrance 26*a* of the through hole 26 is located in the bottom surface of the recessed portion 25. Furthermore, the housing hole 84 housing the flat screw 20 is provided in the case 81 and at least a part of the back surface 28 as the opposite surface to the groove formation surface 21 of the flat screw 20 projects from the housing hole 84, and the peripheral edge portion of the housing hole 84 is the chamfered portion 84*b*.

As shown in FIG. 8, the material is supplied from the feed port 93 to the recessed portion 25 via the supply path 92, and the amount beyond the capacity of the recessed portion 25 is temporarily retained in the space 29 containing the chamfered portion 84*b*. That is, the recessed portion 25 is not essential as long as a space in which the material can be temporarily retained is provided between the feed port 93 and the entrance 26*a* of the through hole 26.

Further, as shown in FIG. 5, the material in the recessed portion 25 sequentially enters the entrance 26*a* of the through hole 26 with the rotation of the flat screw 20 and is fed out from the exit 26*b* to the groove 23 of the groove formation surface 21. The material in the amount fed out to the groove 23 is replenished with the material in the space 29 as needed.

As described above, according to the plasticizing device 100 and the three-dimensional modeling apparatus 300 of the embodiment, the following effects may be obtained.

The plasticizing device 100 is the plasticizing device producing the plasticization material by plasticizing the material, including the flat screw 20 having the groove formation surface 21 with the groove 23 formed therein and rotating around the center line 60 as the rotation axis, the barrel 50 having the opposed surface 52 opposed to the groove formation surface 21 in the direction along the center line 60, in which the communication hole 56 for the plasticization material to flow out is provided, the heaters 58 heating the material supplied to between the groove formation surface 21 and the opposed surface 52, and the case 81 housing the flat screw 20, wherein the supply path 92 for supplying the material to the groove 23 is provided, the through hole 26 communicating with the groove 23 from the back surface 28 at the opposite side to the groove formation surface 21 and surrounded by the wall surface is formed in the flat screw 20, the material is supplied to the groove 23 through the supply path 92 and the through hole 26, the space 29 is provided between the entrance 26*a* of the through hole 26 and the feed port 93 provided in the terminal end portion closer to the flat screw 20 of the terminal end of the supply path 92, and the entrance 26*a* of the through hole 26 and the space 29 communicate in a period of one revolution of the flat screw 20.

According to the configuration, the through hole 26 is provided between the back surface 28 of the flat screw 20 and the groove formation surface 21. Therefore, the supply port corresponding to the through hole is provided in the outer circumferential side surface of the flat screw 20, and thereby, entry of the material into the outer circumferential side surface is prevented and the rotation of the flat screw 20 becomes stable unlike the structure in related art in which the mashed material may enter between the outer circumferential side surface and the case and interfere with the rotation. Further, the space 29 is provided on the through hole 26, and thereby, the entry of the material into the outer circumferential side surface of the flat screw 20 and the interference with the rotation may be prevented and the material temporarily retained in the space 29 may be replenished in the through hole 26 as needed.

Therefore, the plasticizing device 100 having the stable plasticization performance may be provided.

Further, the groove 23 is the spiral groove extending from the first end 23*a* closer to the peripheral edge of the flat screw 20 of a terminal end of the groove to the second end 23*b* closer to the center of the flat screw 20 than the first end 23*a* and the exit 26*b* of the through hole 26 is located at the first end 23*a* as seen from the direction along the center line 60.

According to the configuration, the material supplied from the through hole 26 to the groove 23 is gradually plasticized and flows from the peripheral edge portion to the center along the groove 23 while being heated. Therefore, stable plasticization may be performed.

Further, the recessed portion 25 as a part of the space 29 is formed in the back surface 28 as the opposite surface to the groove formation surface 21, the entrance 26*a* of the through hole 26 is located in the bottom surface of the recessed portion 25, and the area of the recessed portion 25 is larger than the area of the through hole 26 as seen from the direction along the center line 60.

According to the configuration, the material to be supplied to the through hole 26 may be retained within the recessed portion 25.

The bottom surface of the recessed portion 25 has the inclined surface inclined so that the depth of the recessed portion 25 is deeper toward the through hole 26.

According to the configuration, the material may be efficiently supplied to the through hole 26 along the inclined surface of the recessed portion 25.

Further, the recessed portion 25 extends along the outer circumference of the flat screw 20 and the length L of the recessed portion 25 is equal to or smaller than the half of the length of the outer circumference of the flat screw 20.

If the length L of the recessed portion 25 is too long, the inclined surface also becomes longer and the thickness of the flat screw 20 becomes larger. However, according to the configuration, the recessed portion 25 having the inclined surface on which the material easily rolls, in which a necessary amount of material can be retained, may be formed.

Furthermore, in the direction along the center line 60, the recessed portion 25 extends along the outer circumference of the flat screw 20 from the first side 25*a* to the second side 25*b* as the boundaries of the recessed portion 25, the first side 25*a* is located anterior to the second side 25*b* in the rotation direction of the flat screw 20, and the entrance 26*a* of the through hole 26 in the recessed portion 25 is located closer to the second side 25*b* than the first side 25*a*.

According to the configuration, the material is subjected to a centrifugal force toward the through hole 26 with the rotation, and the material may be efficiently supplied to the through hole 26.

The housing hole 84 housing the flat screw 20 is provided in the case 81, at least a part of the back surface 28 as the opposite surface to the groove formation surface 21 of the flat screw 20 projects from the housing hole 84, and the peripheral edge portion of the housing hole 84 is the chamfered portion 84b. According to the configuration, the space 29 containing the chamfered portion 84b may be formed to be larger.

The three-dimensional modeling apparatus 300 includes the plasticizing device 100, the nozzle portion 114 discharging the material plasticized by the plasticizing device 100, and the stage 210 having the modeling surface 215 on which the material is laminated.

According to the configuration, the three-dimensional modeling apparatus 300 includes the plasticizing device 100 having the stable plasticization performance. Therefore, the discharge of the modeling material may be stably performed.

Thus, the three-dimensional modeling apparatus 300 having the stable discharge performance of the modeling material may be provided.

Embodiment 2

Different Form of Flat Screw

Figure 9:
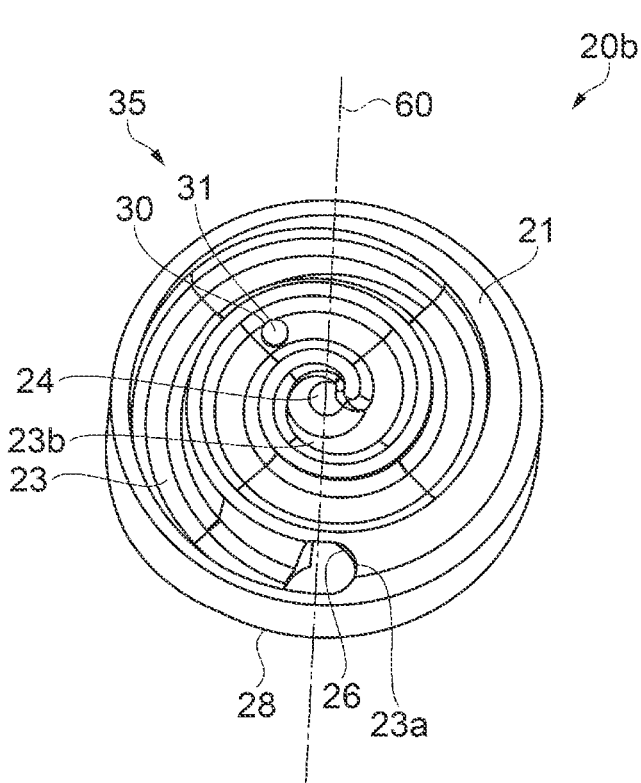
FIG. 9 is a perspective view of a flat screw according to Embodiment 2 as seen from the groove formation surface side.
Figure 10:
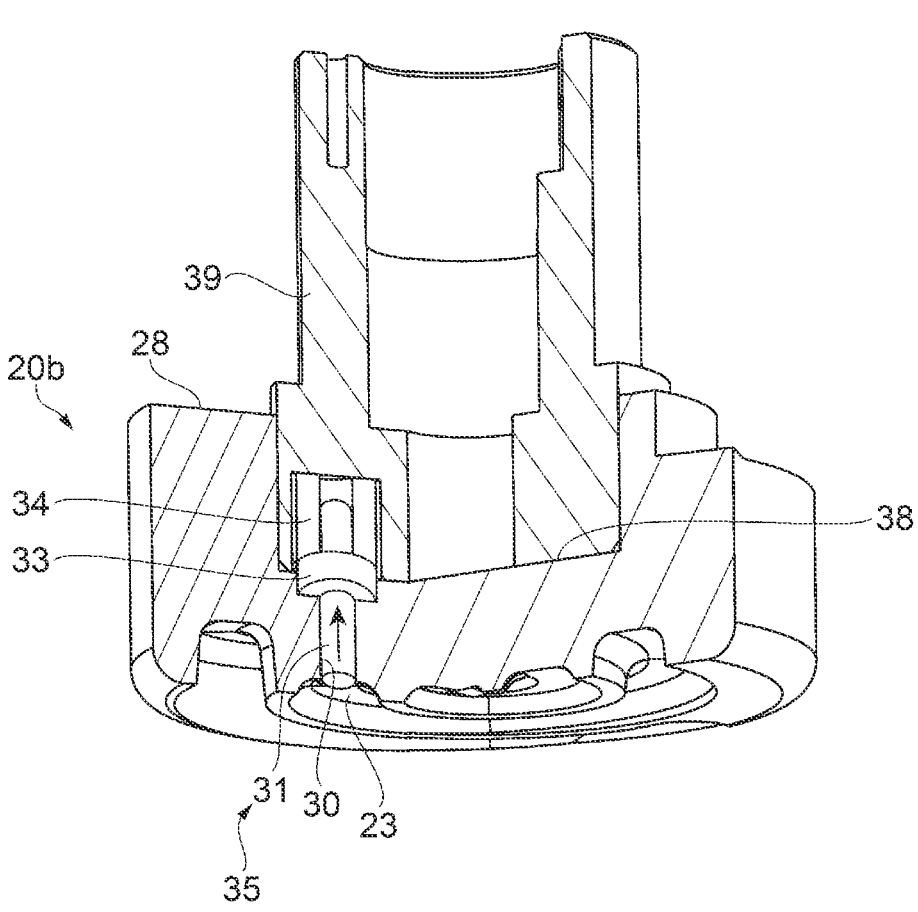
FIG. 10 is a sectional perspective view in a peripheral part of a pressure adjustment unit.

FIG. 9 is a perspective view of a flat screw according to Embodiment 2 as seen from the groove formation surface side and corresponds to FIG. 3. FIG. 10 is a sectional perspective view in a peripheral part of a pressure adjustment unit.

In the flat screw 20 of the above described embodiment, a pressure adjustment unit for adjustment of the pressure within the groove 23 may be provided. As below, the same parts as those of the above described embodiment have the same signs and the overlapping explanation will be omitted.

As shown in FIG. 9, a through hole 30 as a second through hole and a decompression pin 31 inserted into the through hole 30 are provided at the midpoint of the groove 23 of a flat screw 20b of the embodiment. The through hole 30 is a smaller hole than the through hole 26 and provided in the bottom surface of the groove 23.

The decompression pin 31 is a part of a pressure adjustment unit 35, and has a function of forming an air channel (gap) by inserting the head portion into the through hole 30 when the pressure within the groove 23 rises when the material is plasticized and releasing the gas within the groove 23 by the channel.

As shown in FIG. 10, the pressure adjustment unit 35 includes the decompression pin 31, a stopper 33, a spring 34, etc.

The stopper 33 is a member provided at the midpoint of the decompression pin 31 and having a larger flange shape than the diameter of the decompression pin 31. In the back surface 28 of the flat screw 20b, a bearing hole 38 into which a rotation shaft 39 of the rotor drive unit 98 (FIG. 2) is inserted is provided at the center thereof.

A recessed portion receiving the stopper 33 is provided in the bottom surface of the bearing hole 38, and the through hole 30 is provided at the center of the recessed portion.

In a preferred example, the spring 34 is a coil spring and incorporated with the decompression pin 31 projecting from the stopper 33 toward the back surface 28 side as an axis. One abutment end of the spring 34 is the stopper 33 and the other abutment end is a cavity provided within the rotation shaft 39.

As shown in FIG. 10, when the pressure within the groove 23 rises, the head portion of the decompression pin 31 is pressed down in a direction of an arrow by the pressure, a gap is produced between the through hole 30 and the decompression pin 31, and the gas within the groove 23 is released toward the bearing hole 38 side with the gap as a channel. Note that the press-down pressure of the decompression pin 31 may be adjusted by a spring constant of the spring 34. Further, the through hole 30 is provided on the ceiling of the channel, and thereby, may release the gas without inflow of the plasticization material.

In other words, the through hole 30 as the second through hole is formed in the groove 23, and the pressure adjustment unit 35 for adjustment of the pressure within the groove 23 is placed in the through hole 30.

Figure 11:
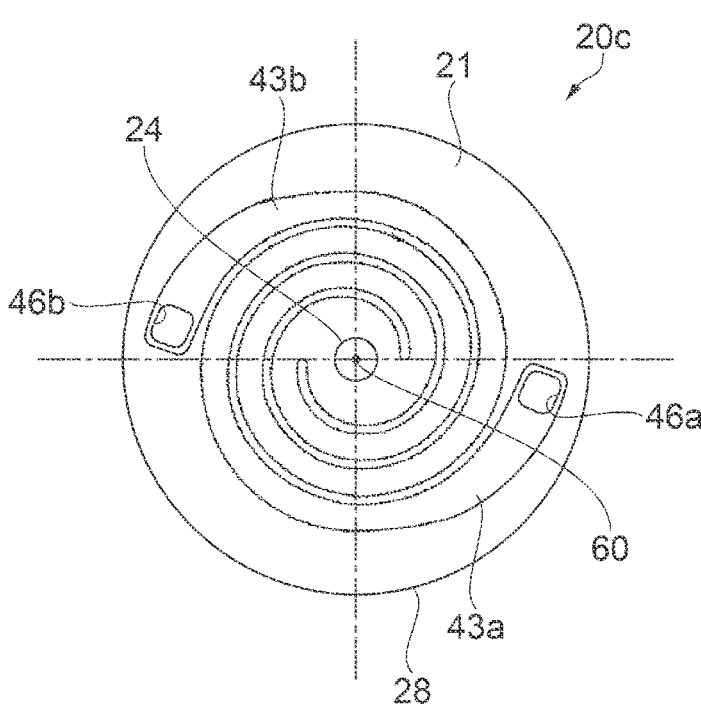
FIG. 11 is a plan view of a flat screw having a different form.

FIG. 11 is a plan view of a flat screw having a different form and corresponds to FIG. 3.

In the flat screw 20 of the above described embodiment, the case where the single groove 23 is provided in the groove formation surface 21 is explained, however, it is not limited to a single groove, and a plurality of grooves may be provided. As below, the same parts as those of the above described embodiment have the same signs and the overlapping explanation will be omitted.

As shown in FIG. 11, in a flat screw 20c of the embodiment, two spiral grooves 43a, 43b are formed.

The groove 43a is the spiral groove extending from the peripheral edge portion of the flat screw 20 to near the center portion 24. The groove 43b is the same spiral groove as the groove 43a. The grooves 43a, 43b communicate in the center portion 24 and extend to a start position different by 180° around the center portion 24 as a rotation center in the peripheral edge portion. At the start point side of the groove 43a, a through hole 46a is provided. At the start point side of the groove 43b, a through hole 46b is provided. The through holes 46a, 46b are the same material supply holes as the through hole 26 in FIG. 3, and the same cutout portions (not shown) as the recessed portion 25 in FIG. 3 are respectively provided at the back surface 28 side.

Note that, in FIG. 11, the example in which the two grooves 43a, 43b are formed is shown, however, the number of grooves may be three or more. Further, the pressure adjustment unit 35 in FIG. 9 may be provided in the grooves 43a, 43b.

As described above, according to the plasticizing device 100 of the embodiment, the following effects may be obtained in addition to the effects in the above described embodiment.

The plasticizing device 100 includes the flat screw 20b, and the through hole 30 as the second through hole is formed in the groove 23 of the groove formation surface 21 and the pressure adjustment unit 35 adjusting the pressure inside of the groove 23 is placed in the through hole 30.

According to the configuration, when the pressure within the groove 23 rises, the head portion of the decompression pin 31 of the pressure adjustment unit 35 is pressed down in the direction of the arrow by the pressure, the gap is produced between the through hole 30 and the decompression pin 31, and the gas within the groove 23 is released toward the bearing hole 38 side with the gap as the channel.

Therefore, the pressure within the groove 23 may be appropriately maintained by the pressure adjustment unit 35 and the plasticization may be stably performed.

Thus, the plasticizing device 100 having the stable plasticization performance may be provided.

Embodiment 3

Injection Molding Apparatus

Figure 12:
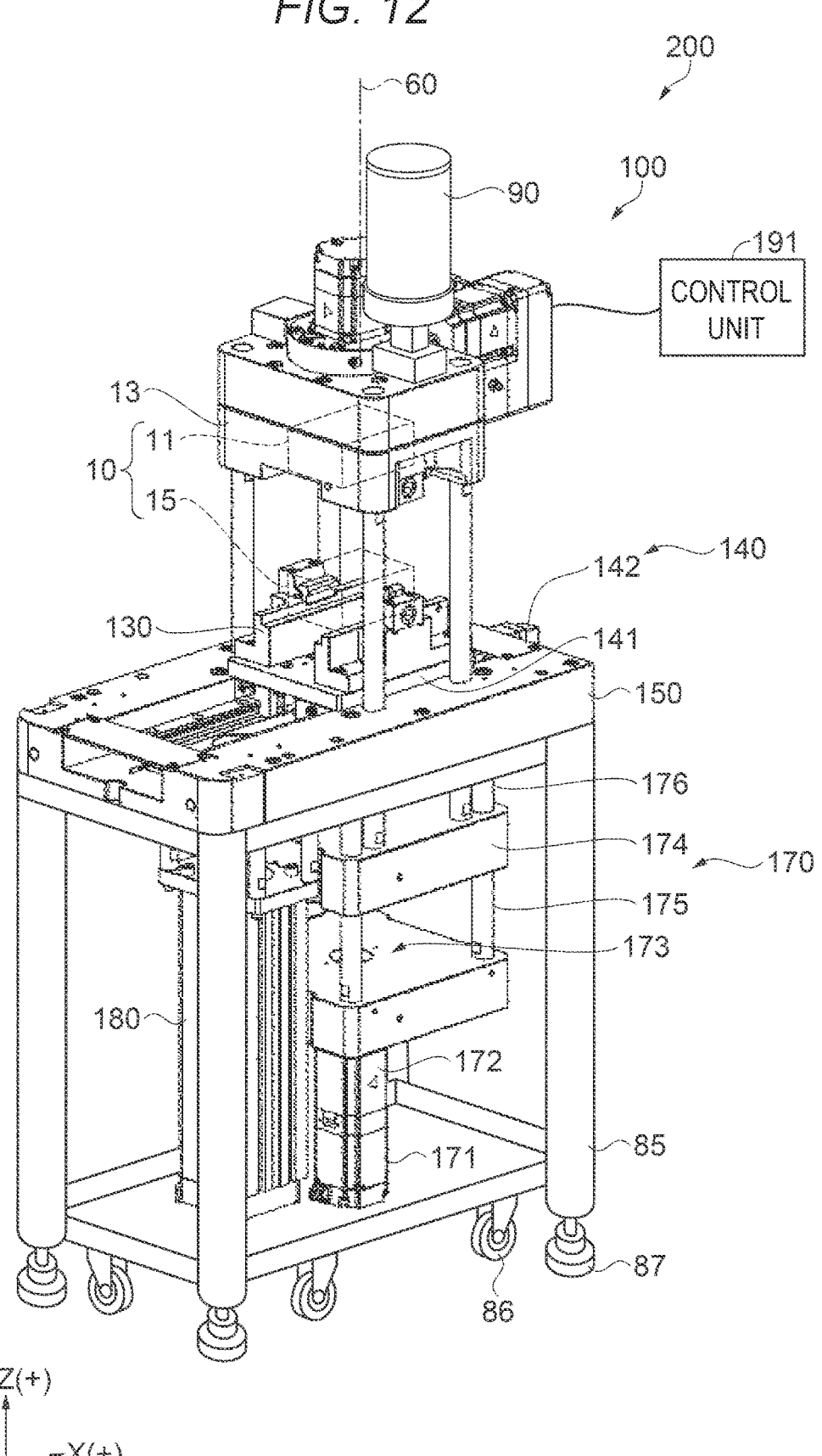
FIG. 12 is a perspective view of an injection molding apparatus according to Embodiment 3.

FIG. 12 is a perspective view showing a schematic configuration of an injection molding apparatus.

The plasticizing devices 100 of the above described respective embodiments may be applied to an injection molding apparatus 200. As below, the same parts as those of the above described embodiments have the same signs and the overlapping explanation will be omitted.

The injection molding apparatus 200 of the embodiment shown in FIG. 12 is a vertical injection molding apparatus including the above described plasticizing device 100. In the injection molding apparatus 200, a base 150 including the plasticizing device 100 is mounted on a movable platform unit 85.

The base 150 is a base member having a rectangular parallelepiped shape and fixed to the platform unit 85. Note that, in FIG. 12, an X-axis, a Y-axis, and a Z-axis as three axes orthogonal to one another are shown. In the base 150, the extension direction of the long side is an X plus direction and the extension direction of the short side is a Y plus direction. The height direction of the injection molding apparatus 200 is a Z plus direction. The Z plus direction is also referred to as an upward direction and a Z minus direction is also referred to as a downward direction.

The injection molding apparatus 200 includes the platform unit 85, the plasticizing device 100, a lower die support unit 130, a position change unit 140, a clamping device 170, an ejector unit 180, a control unit 191, etc.

The platform unit 85 is a robust platform having a metal frame and has wheels 86 in the four corners of the bottom surface thereof. Further, bolt-type stopper feet 87 are provided on supports near the respective wheels 86. Thereby, the injection molding apparatus 200 is moved to a desired position by the wheels 86, and then, may be reliably fixed by the stopper feet 87.

An upper die support unit 13 is provided at the downside of the plasticizing device 100. The upper die support unit 13 includes a clamping mechanism for fixing an upper die 11.

The lower die support unit 130 is provided on the base 150 via a movable portion 141 and includes a clamping mechanism for fixing a lower die 15. Note that FIG. 12 shows a state before attachment of the upper die 11 and the lower die 15 with the dies separated by dotted lines, however, in injection molding, molding is performed with the upper die 11 and the lower die 15 closed by the clamping device 170. A die set including the upper die 11 and the lower die 15 is referred to as a molding die 10.

Further, the upper die support unit 13 and the lower die support unit 130 correspond to a fixing unit. In other words, the injection molding apparatus 200 includes the plasticizing device 100, the nozzle portion 114 (FIG. 2) injecting the material plasticized by the plasticizing device 100, and the upper die support unit 13 and the lower die support unit 130 as the fixing unit fixing the molding die 10 receiving the material.

The position change unit 140 is a stage that can linearly move the lower die support unit 130 along the extension direction of the X-axis. The position change unit 140 has the movable portion 141 supporting the lower die support unit 130 and an electric actuator 142 moving the movable portion 141. In a preferred example, the electric actuator 142 includes a ball screw, a motor rotating the ball screw, etc.

The clamping device 170 closes and opens the molding die 10 by moving the plasticizing device 100 containing the upper die 11 along the Z-axis directions by driving of a clamping motor 171. Specifically, the drive force of the clamping motor 171 is transmitted to a ball screw unit 173 via a reducer 172, and thereby, a movable platen 174 coupled to the ball screw unit 173 moves in the Z directions along a first support portion 175 and the plasticizing device 100 fixed to the movable platen 174 via a second support portion 176 is moved in the Z directions.

Thereby, for closing, the movable platen 174 is moved in the Z minus direction, and thereby, the plasticizing device 100 moves downward and the upper die 11 and the lower die 15 contact. For opening, the movable platen 174 is moved in the Z plus direction, and thereby, the plasticizing device 100 moves upward and the upper die 11 separates from the lower die 15.

The ejector unit 180 is a part for detachment of a molded object from the lower die 15. The ejector unit 180 is provided at the X minus side of the plasticizing device 100 and, when the lower die support unit 130 with the lower die 15 after molding mounted thereon moves to the upside of the ejector unit 180, ejector pins are driven and the molded object is ejected from the lower die 15. The ejector unit 180 is provided at the downside of the base 150.

The control unit 191 includes a computer having one or more processors, a memory portion, and an input/output interface for external input and output of signals. In the memory portion, a molding program in which sequences and details defining opening, closing, injection molding, and ejection of the molded object, a material adjustment program for changing materials and adjusting combination ratios, corresponding data, etc. are stored. The control unit 191 performs integrated control of the entire injection molding apparatus 200 containing the plasticizing device 100 by executing these programs.

As described above, according to the injection molding apparatus 200 of the embodiment, the following effects may be obtained in addition to the effects in the above described embodiments.

The injection molding apparatus 200 includes the plasticizing device 100, the nozzle portion 114 (FIG. 2) injecting the material plasticized by the plasticizing device 100, and the upper die support unit 13 and the lower die support unit 130 as the fixing unit fixing the molding die 10 receiving the material.

According to the configuration, the injection molding apparatus 200 includes the plasticizing device 100 having the stable plasticization performance. Therefore, injection molding may be stably performed.

Thus, the injection molding apparatus 200 having the stable injection molding performance may be provided.

What is claimed is:

1. A plasticizing device producing a plasticization material by plasticizing a material, comprising:

a screw having a groove formation surface with a groove formed therein and rotating around a rotation axis;

a barrel having an opposed surface opposed to the groove formation surface in a direction along the rotation axis, in which a communication hole for the plasticization material to flow out is provided;

a heater heating the material supplied to between the groove formation surface and the opposed surface; and a case housing the screw, wherein a supply path for supplying the material to the groove is provided, a first through hole communicating with the groove from an opposite surface to the groove formation surface and surrounded by a wall surface is formed in the screw, the material is supplied to the groove through the supply path and the first through hole, a space is provided between an entrance of the first through hole and a material feed port provided in a terminal end portion closer to the screw of a terminal end of the supply path in the direction along the rotation axis, and the entrance of the first through hole and the space communicate in a period of one revolution of the screw.

2. The plasticizing device according to claim 1, wherein the groove is a spiral groove extending from a first end closer to a peripheral edge of the screw of a terminal end of the groove to a second end closer to a center of the screw than the first end, and an exit of the first through hole is located at the first end as seen from the direction along the rotation axis.

3. The plasticizing device according to claim 1, wherein a recessed portion as a part of the space is formed in the opposite surface to the groove formation surface, the entrance of the first through hole is located in a bottom surface of the recessed portion, and an area of the recessed portion is larger than an area of the first through hole as seen from the direction along the rotation axis.

4. The plasticizing device according to claim 3, wherein the bottom surface of the recessed portion has an inclined surface inclined so that a depth of the recessed portion is deeper toward the first through hole.

5. The plasticizing device according to claim 3, wherein the recessed portion extends along an outer circumference of the screw, and a length of the recessed portion is equal to or smaller than a half of a length of the outer circumference of the screw.

6. The plasticizing device according to claim 3, wherein the recessed portion extends along an outer circumference of the screw from a first side to a second side as boundaries of the recessed portion in the direction along the rotation axis, the first side is located anterior to the second side in a rotation direction of the screw, and the entrance of the first through hole in the recessed portion is located closer to the second side than the first side.

7. The plasticizing device according to claim 1, wherein a housing hole housing the screw is provided in the case, at least a part of the opposite surface to the groove formation surface of the screw projects from the housing hole, and a peripheral edge portion of the housing hole is chamfered.

8. The plasticizing device according to claim 1, wherein a second through hole is formed in the groove, and a pressure adjustment unit adjusting pressure inside of the groove is placed in the second through hole.

9. A three-dimensional modeling apparatus comprising:

the plasticizing device according to claim 1; and a nozzle portion discharging the plasticization material toward a stage.

* * * * *